May 3, 1955  EIJI MUNEKATA ET AL  2,707,671
AMMONIA RECOVERY FROM CUPRAMMONIUM RAYON WASTE LIQUORS
Filed Dec. 8, 1952
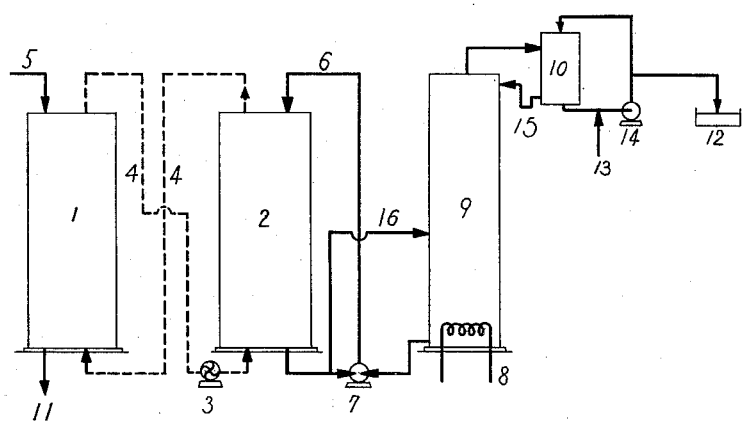
INVENTOR.
Eiji Munekata and Kazuhiko Mihara
BY

United States Patent Office 2,707,671
Patented May 3, 1955

2,707,671
AMMONIA RECOVERY FROM CUPRAMMONIUM RAYON WASTE LIQUORS

Eiji Munekata, Nakano Ku, Tokyo, and Kazuhiko Mihara, Hioki-Gun, Kagoshima, Japan, assignors to Asahi Chemical Industry Co., Ltd., Osaka, Japan Application December 8, 1952, Serial No. 324,764
Claims priority, application Japan November 27, 1952

7 Claims. (Cl. 23—197)

The present invention relates to the recovery of ammonia from cuprammonium rayon waste liquors and to the recycling of such recovered ammonia for the make-up of the cuprammonium solutions used in rayon manufacture.

In the manufacture of rayon by the conventional cuprammonium method, it has been our practice to recover ammonia from various waste solutions including a minor quantity of ammonia, such as warm spinning water bath waste, refining waste, etc., by means of the process of Japanese Patent No. 123,122, "Methods of Recovering Volatile Substances From Their Dilute Water Solutions." According to this method, a dilute ammonia is treated in contact with a large quantity of counter-current air to form a dilute ammonia vapour, which in turn is converted to ammonium sulphate solution using sulphuric acid as the absorbent. This solution is concentrated by thermal evaporation to solid ammonium sulphate. Consequently, it is impossible to utilize the recovered ammonium constituent as the raw material for preparation of the spinning solution in a circulatory manner in the manufacture of cuprammonium rayon.

It is an object of the present invention to provide a method of manufacturing cuprammonium rayon economically using recovered ammonia in a circulatory manner.

It is another object of the invention to provide a process for recovering ammonia in free liquid state of high concentration from waste solutions in the known cuprammonium rayon process.

There are other objects and particularities of the invention, which will be obvious from the following detailed description of the invention.

According to the present invention, mono-ammonium phosphate is used as the absorbent instead of the aforesaid sulphuric acid to utilize the following reaction:

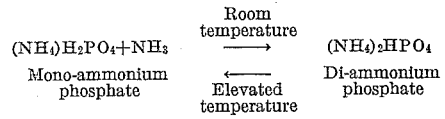

Thus, mono-ammonium phosphate absorbs ammonia at a room temperature to form di-ammonium phosphate which liberates ammonia at an elevated temperature.

According to a preferred form of the invention, various waste solutions, in manufacturing process of cuprammonium rayon, including minor ammonia contents, such as of about 300 to 2000 mg./l. of ammonia ($NH_3$), are brought in to contact with countercurrent air of over 800 times the waste solution in volume to gasify the ammonia. The resulting air containing ammonia vapour is led to a separating chamber in which the vapour is subject to a shower or spray of a mixture of mono-ammonium phosphate aqueous solution and di-ammonium phosphate aqueous solution. The ammonia diluted with air is thus brought into intimate contact with the mixed solution of the phosphates and the ammonia is completely absorbed thereby. It is to be noted here that the mixed solution of the phosphates is kept at a temperature a little higher than that of the waste liquor from which ammonia is to be recovered. Then evaporation heat and absorption heat in both of the evaporation chamber and absorption chamber are controlled in order to balance the partial pressure of vapour in the evaporation chamber where ammonia is evaporated by air and that of vapour in the separate ammonia absorption chamber. In the evaporation chamber ammonia alone is evaporated and as the result the concentration and dilution of absorbent in the absorption chamber are prevented.

The mixed solution of the phosphates with an increased content of di-ammonium phosphate thus formed is then heated and distilled to decompose the di-ammonium phosphate to liberate ammonia. The liberated ammonia may be made to combine with the concurrently evolving water vapour to form ammonia water of a suitable and relatively high concentration upon cooling, or alternatively the ammonia vapour may be absorbed by water in an absorbing apparatus to form ammonia water of a suitable and relatively high concentration.

When the above-mentioned heating, decomposition and distillation process is effected under a high pressure, the decomposition rate is adequately high so that the apparatus employed for the process may be of a relatively small size. Moreover, under a high pressure, the amount of heat to be consumed for cooling to form ammonia water is very small, and the required cooling can readily be effected. Ammonia vapour can also be absorbed readily by water to form an ammonia water under a high pressure. The process may be effected under a normal pressure, and in this case, there is of need of consideration on the pressure and the apparatus may consequently be of a simple construction but more heat must be consumed for the formation of ammonia water than in the case of high pressure. The absorption rate of ammonia vapour by water is also relatively low. The process can be effected even under a reduced pressure. In this case, the decomposition rate of di-ammonium phosphate is further lowered, but there is an advantage in that the heating temperature may be relatively low. The conditions for the distillation, however, are inferior both in the cooling and water absorption.

After the decomposition and distillation, the mixed solution of the phosphates now with an increased content of mono-ammonium phosphate is recirculated to be used as the absorbent for ammonia in the above-mentioned absorption chamber in the manner described. A minor quantity of the liberated ammonia vapour may not be absorbed by the water. Such ammonia vapour is made to be absorbed by a portion of the mixed solution of the phosphates with the increased content of mono-ammonium phosphate, and the resulting solution enriched in di-ammonium phosphate is treated as above described to recover ammonia.

The invention may be fully understood by the following description of a practical example of carrying out the invention into effect with reference to the accompanying drawings, in which the single figure shows diagrammatically various steps of the process.

At a cuprammonium rayon manufacturing plant of 8-tons per day production, there will be obtained about 500 m.³/hour of waste solution containing a minor quantity of ammonia of about 500 mg./l. This waste solution is fed through a conduit 5 to an evaporating chamber 1, into which chamber water vapor-saturated air is supplied by a blower 3 through a conduit 4 at a rate of about 17,000 m.³/min. in a counter-current relation with the waste solution. A dilute ammonia vapour is thereby obtained at a concentration of 250 mg./m.³. This vapour is then introduced into an absorption tower 2 which is fed with an absorbent containing mono-ammonium phosphate of the concentration of 12 g./100 cc. at 30° C. The absorbent may be a mixture of aqueous solutions of mono-ammonium phosphate and di-ammonium phosphate. The ammonia vapour is brought into contact with the absorbent in a counter-current relation within the absorption tower 2, and reacts with mono-ammonium phosphate to form di-ammonium phosphate.

The waste water deprived of ammonia by evaporation in the evaporating chamber 1 is exhausted by way of a drain pipe 11. The absorbent is continuously circulated by means of a pump 7, and processed to be maintained at a constant concentration of mono-ammonium phosphate. A portion of the circulating absorbent which now contains about 23% of di-ammonium phosphate is introduced into a distillation tower 9 through a pipe 16 at an intermediate level. A steam heater coil 8 is disposed within the bottom portion of the tower 9. The absorbent introduced into the tower 9 as above described is there heated by the ascending steam heated and evaporated by the heater coil 8 to liberate ammonia gas. The mixed vapor of the liberated ammonia and steam passes to and is discharged from the top of the tower 9 as an ammonia gas of nearly 100% in concentration. This gas is introduced into a cooling condenser 10 and condensed and absorbed by 25% ammonia water of 20° C. which is continuously circulated through the condenser by means of a pump 14. A portion of the circulating liquid is withdrawn out of the circuit into a product receiver 12, and water is fed into the circuit through a pipe 13 so that the whole quantity of the circulating liquid and its concentration can be kept constant. The ammonia water of 25 g./100 cc. accumulating in the receiver 12 is reused at the cuprammonium rayon manufacturing plant in a circulatory manner, by way of suitable means, not shown.

In the lower portion of the distillation tower 9, there is accumulated a mixture of mono-ammonium phosphate and di-ammonium phosphate with an increased content of mono-ammonium phosphate by the decomposition of di-ammonium phosphate, and this mixed solution is returned to the absorption tower 2 through a conduit 6 by the pump 7 to be used as the absorbent. A portion of the ammonia water in the condenser 10 is refluxed to the tower 9 through a pipe 15.

We claim:

1. In a process of ammonia recovery from cuprammonium rayon waste liquor and recycling the recovered ammonia for the makeup of the fresh cuprammonium solution used in rayon manufacture, that improvement comprising contacting said waste solution with a large quantity of heated counter-current air to gasify the ammonia therefrom, introducing the resulting air laden with gasified ammonia into an absorption chamber in which the ammonia-containing vapour is brought into contact with an absorbent consisting of a mixture of aqueous solutions of mono-ammonium phosphate and di-ammonium phosphate at a little higher temperature than said waste solution to convert a portion of said mono-ammonium phosphate into di-ammonium phosphate, heating and distilling said absorbent enriched with di-ammonium phosphate to decompose the latter into ammonia vapor and mono-ammonium phosphate, recirculating the solution of mono-ammonium phosphate after said decomposition to said absorption chamber, and recovering, on the other hand, said ammonia liberated by said decomposition in the form of ammonia water, for recirculating for use in said cuprammonium rayon process.

2. A method according to claim 1, in which said heating and distillation of said absorbent is carried out under a high pressure.

3. A method according to claim 1, in which said heating and distillation of said absorbent is carried out under a normal pressure.

4. A method according to claim 1, in which said heating and distillation of said absorbent is carried out under a reduced pressure.

5. In the method of manufacturing rayon by the cuprammonium process utilizing recovered ammonia recycled to make up the fresh cuprammonium dissolving bath, said ammonia being recovered from a waste solution from said cuprammonium process, that improvement comprising bringing said waste solution including a minor quantity of ammonia into contact with a large quantity of heated counter-current air, introducing the resulting air laden with evaporated ammonia into an absorption chamber in which the ammonia containing air is brought into contact with an absorbent comprising a mixture of aqueous solution of mono-ammonium phosphate and di-ammonium phosphate at a little higher temperature than said waste liquor and converted to di-ammonium phosphate by reaction with a portion of said mono-ammonium phosphate, heating and distilling said absorbent enriched with di-ammonium phosphate by said reaction to decompose the latter into ammonia vapour and mono-ammonium phosphate, recirculating said absorbent now enriched with mono-ammonium phosphate by said decomposition back to said absorption chamber, while on the other hand leading said ammonia vapour liberated by said decomposition to a cooling condenser in which said ammonia vapour is condensed and absorbed by water to form ammonia water.

6. In the method of manufacturing rayon by the cuprammonium process utilizing recovered ammonia recycle to make up the fresh cuprammonium dissolving bath, said ammonium being recovered from a waste solution containing a minor quantity of ammonia and obtained in said cuprammonium process, that improvement comprising bringing said waste solultion into contact with a large amount of heated counter-current air, introducing the resulting air laden with evaporated ammonia into an absorption chamber in which the ammonia vapour-containing air is brought into contact with an absorbent comprising a mixture of aqueous solutions of mono-ammonium phosphate and di-ammonium phosphate at a little higher temperature than said waste solution and converted to diammonium phosphate by reaction with a portion of said mono-ammonium phosphate, heating and distilling said absorbent enriched with diammonium phosphate by said reaction to decompose the latter into ammonia and mono-ammonium phosphate, said heating and distilling concurrently producing water vapour, recirculating said absorbent now enriched with mono-ammonium phosphate by said decomposition back to said absorption chamber, while on the other hand said ammonia vapour and water vapour are mixed with each other and cooled and condensed to form ammonia water.

7. In a continuous process of recovering ammonia in the form of an aqueous solution of a high concentration suitable for the circulatory use in the cuprammonium rayon manufacturing process from a waste solution containing a minor quantity of ammonia from said cuprammonium process, that improvement comprising the steps of bringing said waste solution into contact with a large amount of a heated counter-current air stream to evaporate the ammonia from said waste solution, introducing the resulting air containing evaporated ammonia into an absorption tower in which the ammonia-containing air is brought into contact with mono-ammonium phosphate to convert said phosphate to di-ammonium phosphate, continuously distilling said di-ammonium phosphate to decompose it into ammonia and mono-ammonium phosphate, and separating the ammonia which is continuously distilled, leading said ammonia to a condenser in which the ammonia is converted to ammonia water of a suitable high concentration, and recirculating the ammonia water to the spinning solution, while the mono-ammonium phosphate rich residue is returned to said absorption chamber.

References Cited in the file of this patent

UNITED STATES PATENTS

| | | |
|---|---|---|
| 1,023,548 | Bronnert | Apr. 16, 1912 |
| 1,701,110 | Hofmann | Feb. 5, 1929 |
| 2,315,201 | Haltmeier | Mar. 30, 1943 |

FOREIGN PATENTS

| | | |
|---|---|---|
| 493,716 | Great Britain | Oct. 12, 1938 |